US006725491B2

(12) United States Patent
Hung

(10) Patent No.: US 6,725,491 B2
(45) Date of Patent: Apr. 27, 2004

(54) CAR WAXING MACHINE WITH DRIVING HANDLE

(75) Inventor: Victor Hung, Lu Chu Hsiang (TW)

(73) Assignee: Shinn Fu Corporation (TW)

( * ) Notice: Subject to any disclaimer, the term of this patent is extended or adjusted under 35 U.S.C. 154(b) by 231 days.

(21) Appl. No.: 09/954,156

(22) Filed: Sep. 18, 2001

(65) Prior Publication Data

US 2003/0051303 A1 Mar. 20, 2003

(51) Int. Cl.[7] ............................ B60S 3/06; A47L 11/14; A47L 11/282

(52) U.S. Cl. ............................ 15/97.1; 15/28; 16/110.1

(58) Field of Search .......................... 15/21.1, 28, 97.1, 15/97.5; 16/110.1; 451/357, 359

(56) References Cited

U.S. PATENT DOCUMENTS 5,289,605 A * 3/1994 Armbruster ................. 15/97.1
5,347,673 A * 9/1994 Nickels, Jr. .................. 15/97.1
6,499,172 B1 * 12/2002 McCracken ................. 15/97.1
2002/0182991 A1 * 12/2002 Hung ......................... 451/359

* cited by examiner

*Primary Examiner*—Terrence R. Till
(74) *Attorney, Agent, or Firm*—Bacon & Thomas, PLLC

(57) ABSTRACT

A car waxing machine with a driving handle comprises a car waxing machine and two pivotal handles. Each pivotal handle is a rod shape arm. The arm has a bent structure. Thereby, a rear section of the pivotal handle has a pivotal end and a front end thereof has an arm. By the arms of the two pivotal handles to be pivotally connected to two sides at the rear end of the car waxing machine, a structure with two arms at two sides which is rotatable for adjust the orientations of the arm is formed. Thereby, the arms are adjustable to horizontally extend to the two sides of the car waxing machine. Therefore, the user may adjust the arms to match the habits of using a car waxing machine and further forces can be uniformly applied to the machine.

13 Claims, 14 Drawing Sheets

CAR WAXING MACHINE WITH DRIVING HANDLE

FIELD OF THE INVENTION

The present invention relates to a waxing machine, and particularly to a car waxing machine which is a portable electromotive machine, wherein by pivotal handles at two sides of the car waxing machine, the user may adjust the arms to match the habits for using the car waxing machine and further forces can be uniformly applied to the machine.

BACKGROUND OF THE INVENTION

FIGS. 1 and 2 and U.S. Pat. No. 5,830,047 discloses a prior art car waxing machine. In general, a front side of the wax machine is installed with a semicircle annular arm 101. The user may hold and press the arm for waxing. Since the arm 101 is installed in the front side of the waxing machine 10, it is hard for the user to apply uniform force thereto. As a result, in application, it is often that it is necessary that the font end of the sponge disk is in contact with the surface of the car instead of the whole sponge disk being in contact with the surface. As a result, the waxing work cannot be executed successfully. Especially wax will be remained on the surface of the car. Thus, the user must wipe the point repeatedly. Therefore, this prior semicircle arm 101 at the front side of the car waxing machine 10 has the defect of non-uniformly applying force. Similarly. U.S. Pat. No. 3,849,943 illustrates a T shape arm 201, but the same defects occur.

Referring to FIG. 4, to avoid that a non-uniform force to be applied to the waxing machine, fixing arms 301 at two sides of a waxing machine are developed. Although this design may cause that the user may apply force uniformly to the waxing machine, in general the wax is coated on the surface of a car instead of only applying on the horizontal surface. The waxing surface includes the head, lateral side, etc. Therefore, the operator must change pose for waxing. However, above arms at two sides of the arm 301 provide no structure for adjusting orientation. Thus, user can not adjust the angle as desired. Therefore, this waxing machine 30 having arms 301 can not be used comfortably.

Moreover, in general, the upper or rear ends of the waxing machines are extended with power wires for providing power to a motor. The winding of the power wires will affect the waxing work of the operator. Therefore, in general, it is desired that the wires are wound around the shoulders of the operator so as not to affect the holding of the waxing machine. Therefore, as the user adjusts the angle of the arm freely, the waxing work will not be interfered by the power wire.

SUMMARY OF THE INVENTION

Accordingly, the primary object of the present invention is to provide a car waxing machine with a driving handle comprising a car waxing machine and two pivotal handles. Each pivotal handle is a rod shape arm. The arm has a bent structure. Thereby, a rear section of the pivotal handle has a pivotal end and a front end thereof has an arm. By the arms of the two pivotal handles to be pivotally connected to two sides at the rear end of the car waxing machine, a structure with two arms at two sides which is rotable to adjust the orientations is formed. Thereby, the arms are adjustable to horizontally extend to the two sides of the car waxing machine. Therefore, the user may adjust the arms to match the habits for using the car waxing machine and further forces can be uniformly applied to the machine.

Another object of the present invention is to provide a car waxing machine with a driving handle, wherein the pivotal handle has an arm, a fixing seat, a shaft, an eccentric shaft, and a movable piece. Thereby, the movable piece can be removed easily so that the arm can be adjusted. Furthermore, the movable piece can be closed rapidly.

A further object of the present invention is to provide a car waxing machine with a driving handle, wherein the arm of the pivotal handle at two sides of the car waxing machine may be bent like a round arc and have a holding end which is slightly bent forwards, so that the user may apply force uniformly to the car waxing machine.

A further object of the present invention is to provide a car waxing machine with a driving handle, wherein the arm of the pivotal handle at two sides of the car waxing machine may be bent vertically and have a holding end which is slightly bent upwards or forwards, so that the user may apply force uniformly to the car waxing machine. Furthermore, the waxing work to the car along different direction can be performed easily.

The various objects and advantages of the present invention will be more readily understood from the following detailed description when read in conjunction with the appended drawing.

DETAILED DESCRIPTION OF THE PREFERRED EMBODIMENTS

Figure 1:
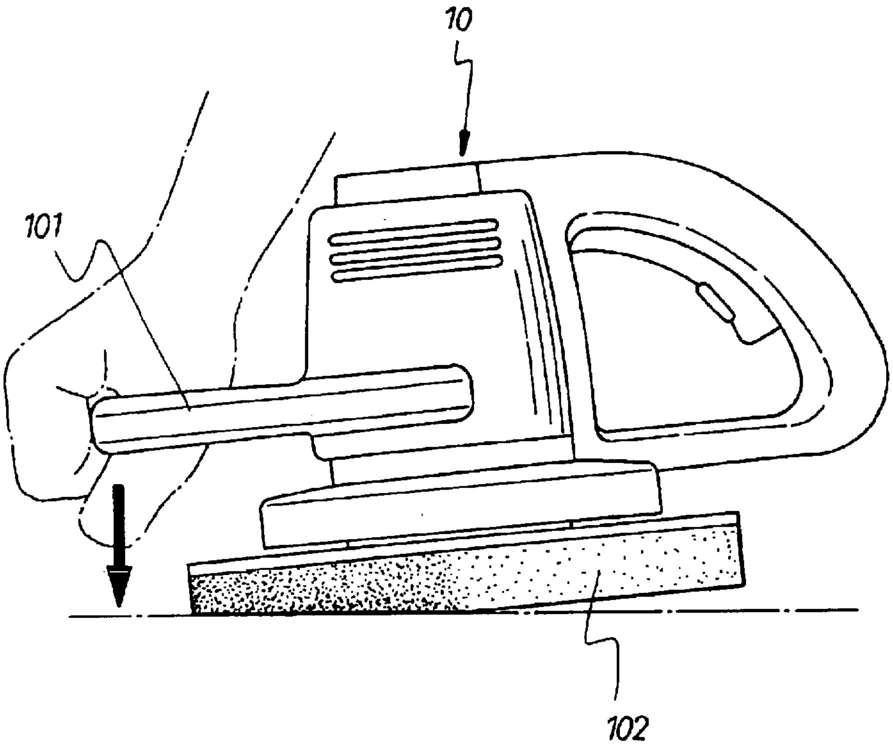
FIG 1 (PRIOR ART)
FIG. 1 is a lateral view of the prior art, wherein the waxing machine is installed in the front end of an arm.
Figure 2:
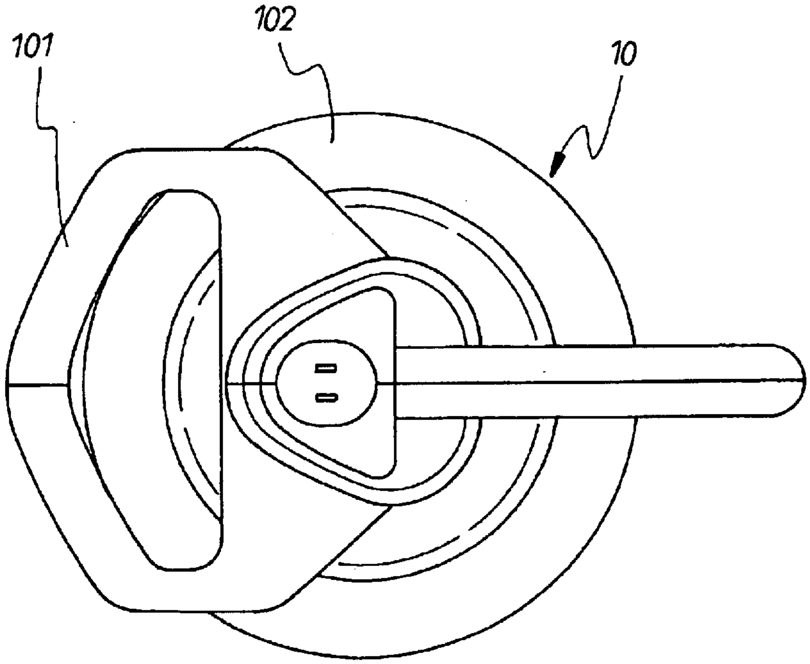
FIG 2 (PRIOR ART)
FIG. 2 is an elevatioal view of the prior art, wherein the waxing machine is installed in the front end of an arm.
Figure 3:
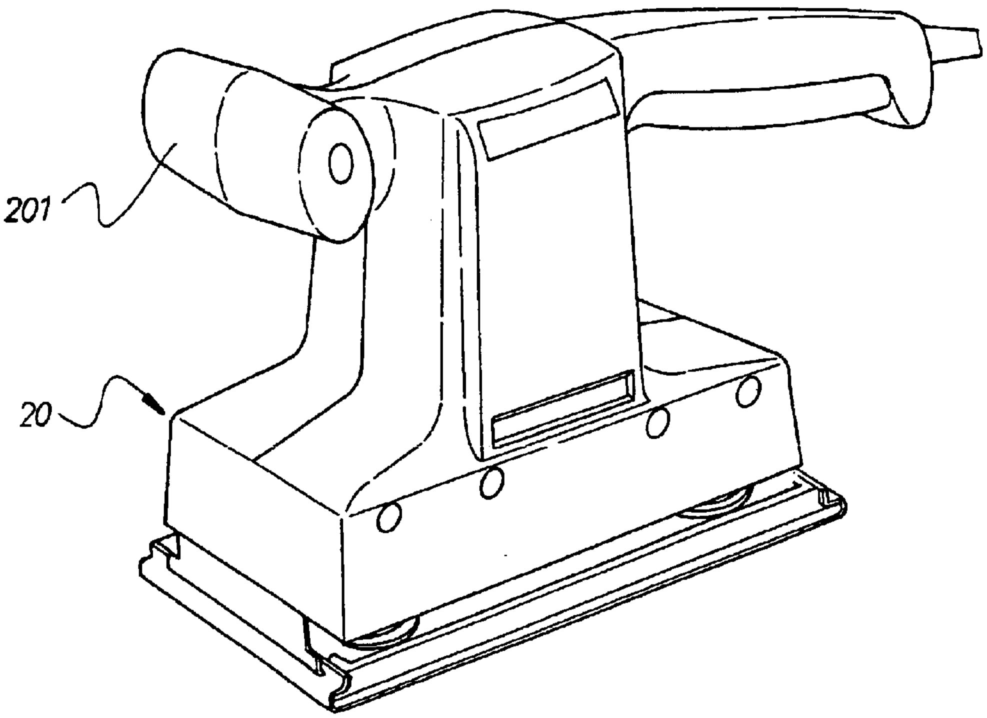
FIG 3 (PRIOR ART)
FIG. 3 is a perspective view of the prior art, wherein the waxing machine is installed in the front end of an arm.
Figure 4:
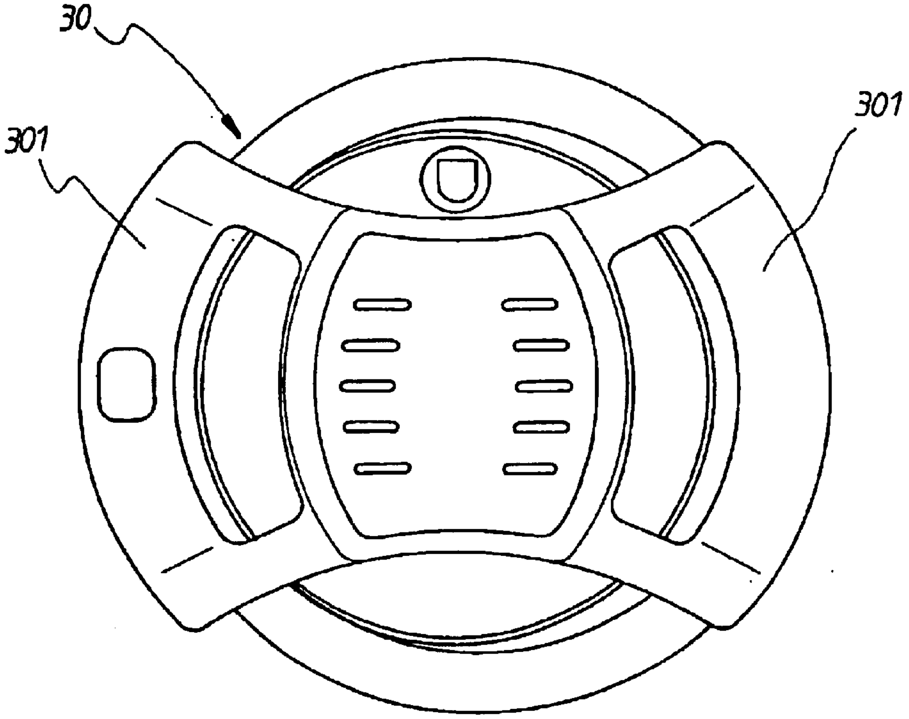
FIG 4 (PRIOR ART)
FIG. 4 is an elevational view of the prior art, wherein the waxing machine is installed at two sides of an arm.
Figure 5:
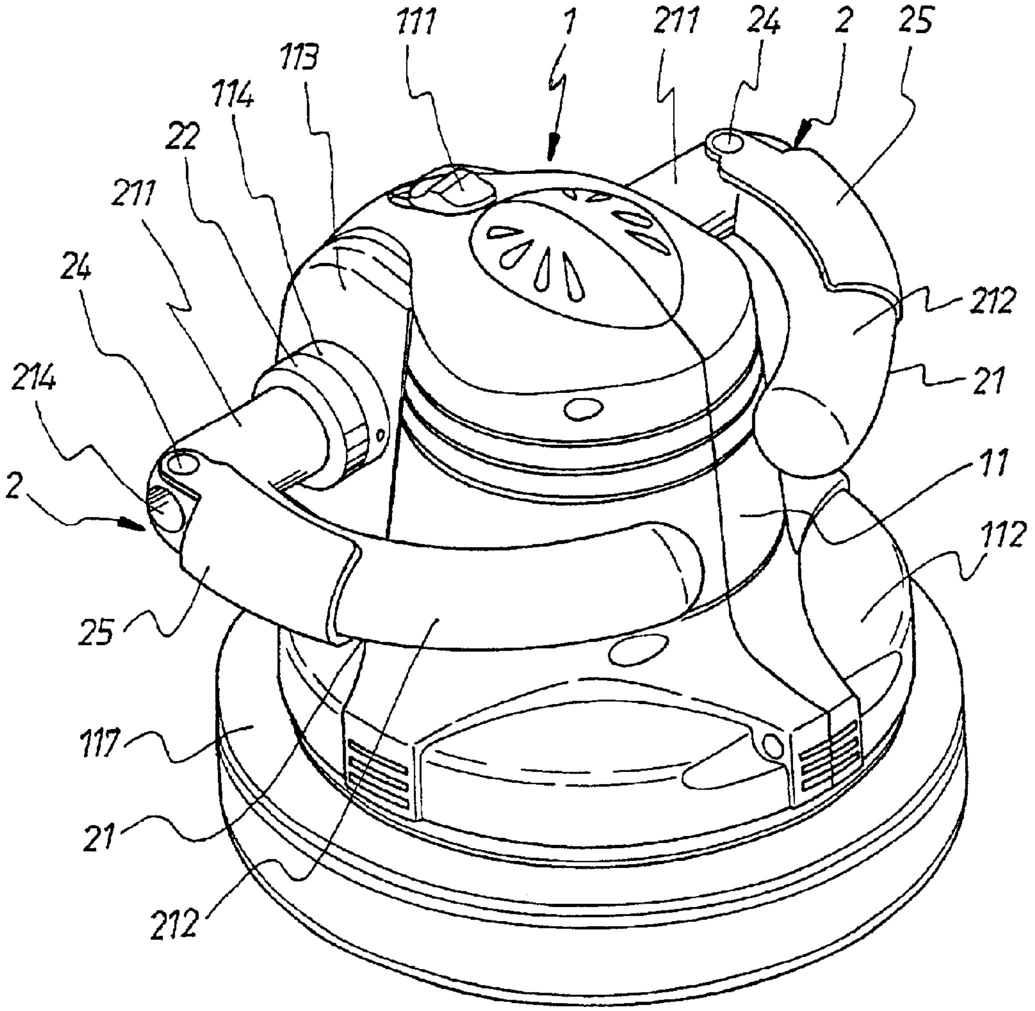
FIG. 5 is a perspective view showing the assembly of the car waxing machine of the present invention.
Figure 6:
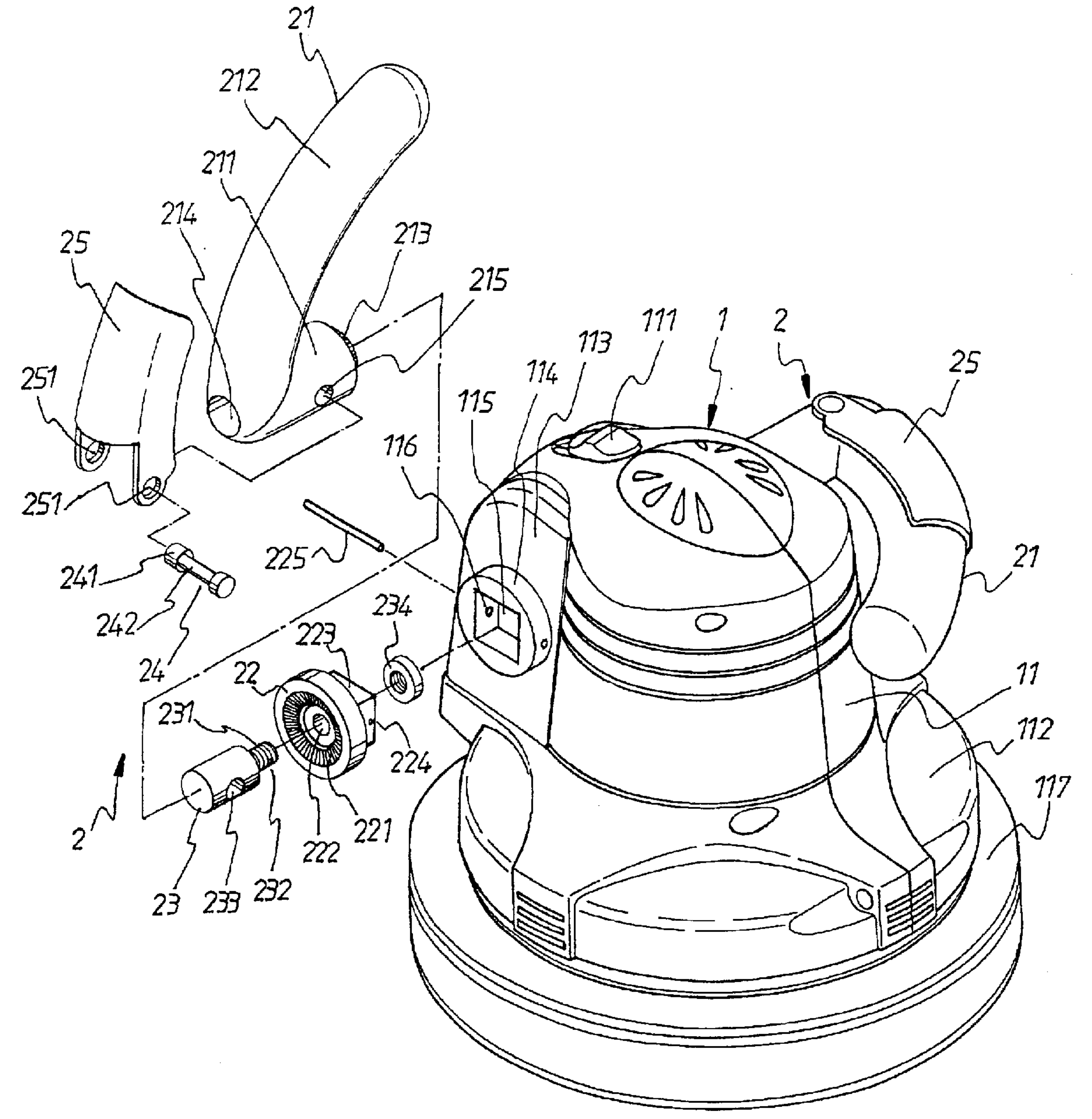
FIG. 6 is a partial exploded perspective view of the pivotal handle of the present invention.

Referring to FIGS. 5 and 6, the car waxing machine with a driving handle of the present invention is illustrated. The car waxing machine with a driving handle includes a car waxing machine 1 and pivotal handles 2.

Figure 11:
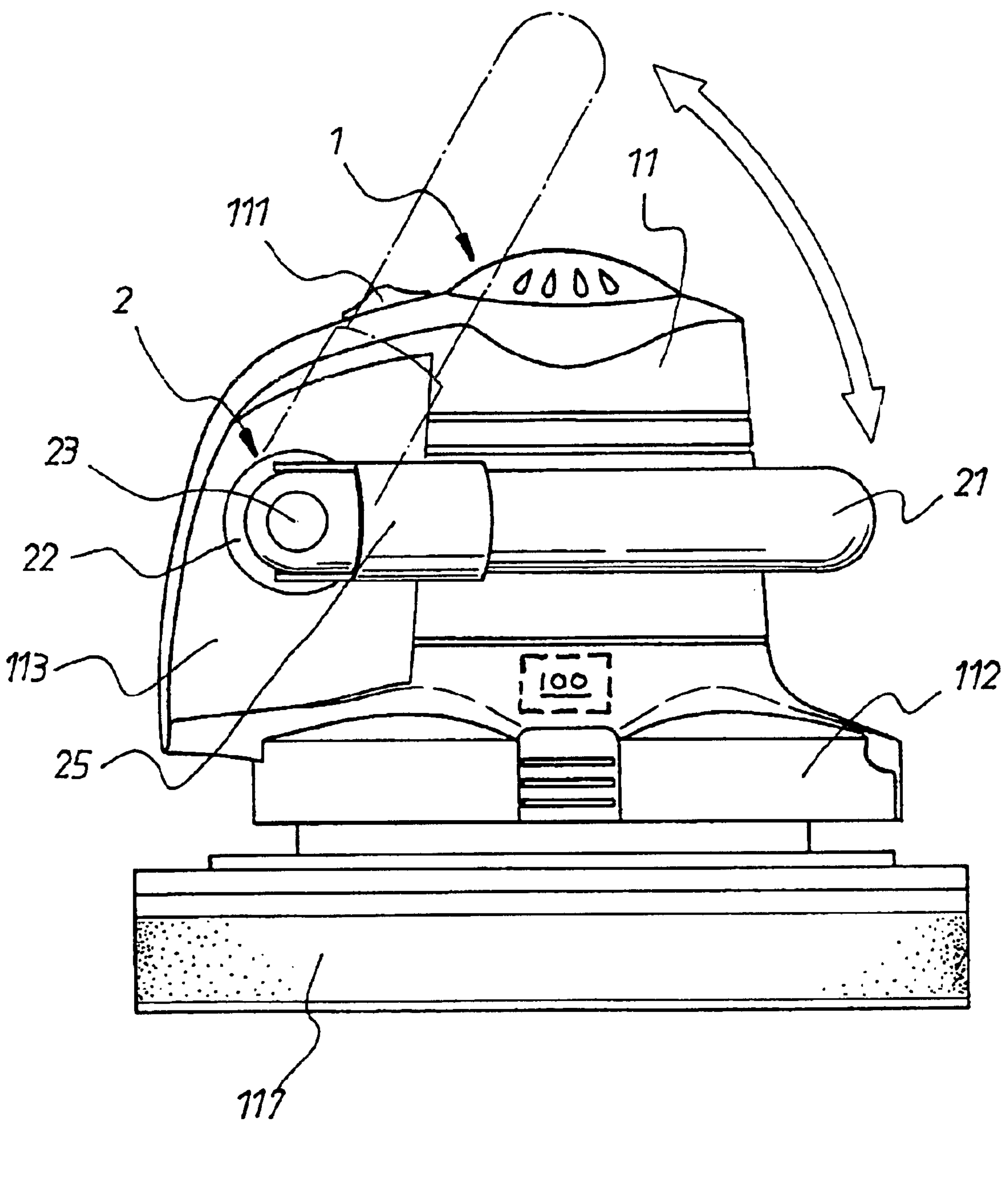
FIG. 11 is a schematic view showing the adjustment of angle of the pivotal handle of the present invention.

The car waxing machine 1 is a portable electromotive waxing machine which can be used on a car. The outer side thereof is installed with a hollow cylindrical casing 11 made of plastic or metal material. The upper end of the casing 11 is installed with a power switch 111. The lower end thereof is a U shape round disk 112. The rear side of the casing 11 is installed with a projecting seat 113. Two sides of the projecting seat 113 are installed with respective posts 114. The post 114 has a rectangular hole 115 at the center portion thereof. One lateral wall thereof has a penetrating hole 116. Therefore, by above components, the casing 11 of the car waxing machine 1 is formed. A driving motor 100, as shown in FIG. 11, can be installed therein so as to drive a polished body 117 at the lower side of the round disk 112 for waxing the surface of a car. The polished body 117 is a sponge block. The shape of the casing 11 can be machined to a desired shape without being confined by above embodiment.

The pivotal handle 2 (referring to FIGS. 6 and 7) is formed by an arm 21, a fixing seat 22, a shaft 23, an eccentric shaft 24, and a movable piece 25.

The arm 21 is a round pivotal end 211. The front section thereof is bent as cambered holding end 212. The pivotal end 211 is installed with a protruded triangular teeth shape umbrella shape gear 213. The center of the umbrella shape gear 213 is formed with an axial penetrating hole 214. The lateral surface of the pivotal end 211 is installed with a radial penetrating pivotal hole 215. The pivotal hole 215 is vertical to the axial penetrating hole 214.

The fixing seat 22 is a round seat. The center of the front surface thereof is installed with a umbrella shape gear 221 which has triangular teeth and are concave. The center of the umbrella shape gear 221 is installed with a stepped hole 222 which penetrates the umbrella shape gear. The rear side thereof is installed with a rectangular post 223. One side of the rectangular post 223 is installed with a radially penetrated pin hole 224. The pin hole 224 is communicated with the stepped hole 222. A pin 225 passes through the hole.

The shaft 23 is a round cylindrical rod. One end thereof has a threaded section 231. One lateral surface of the threaded section 231 has a pin hole 232. The lateral surface of the round cylindrical rod is radially installed with a through hole 233. The diameter of the through hole 233 is identical to that of the pivotal hole 215 of the arm 21.

The eccentric shaft 24 is a cylindrical shaft 241. The middle section thereof is installed with an eccentric section 242 having a smaller diameter. The outer diameter of the eccentric section 242 is tangent to the cylindrical shaft 241 so as to be formed with a shifted round shaft.

The movable piece 25 is installed as a cambered piece and has a U shape cross section. The two lateral walls at the distal end thereof are installed with respective pivotal holes 251.

Figure 7:
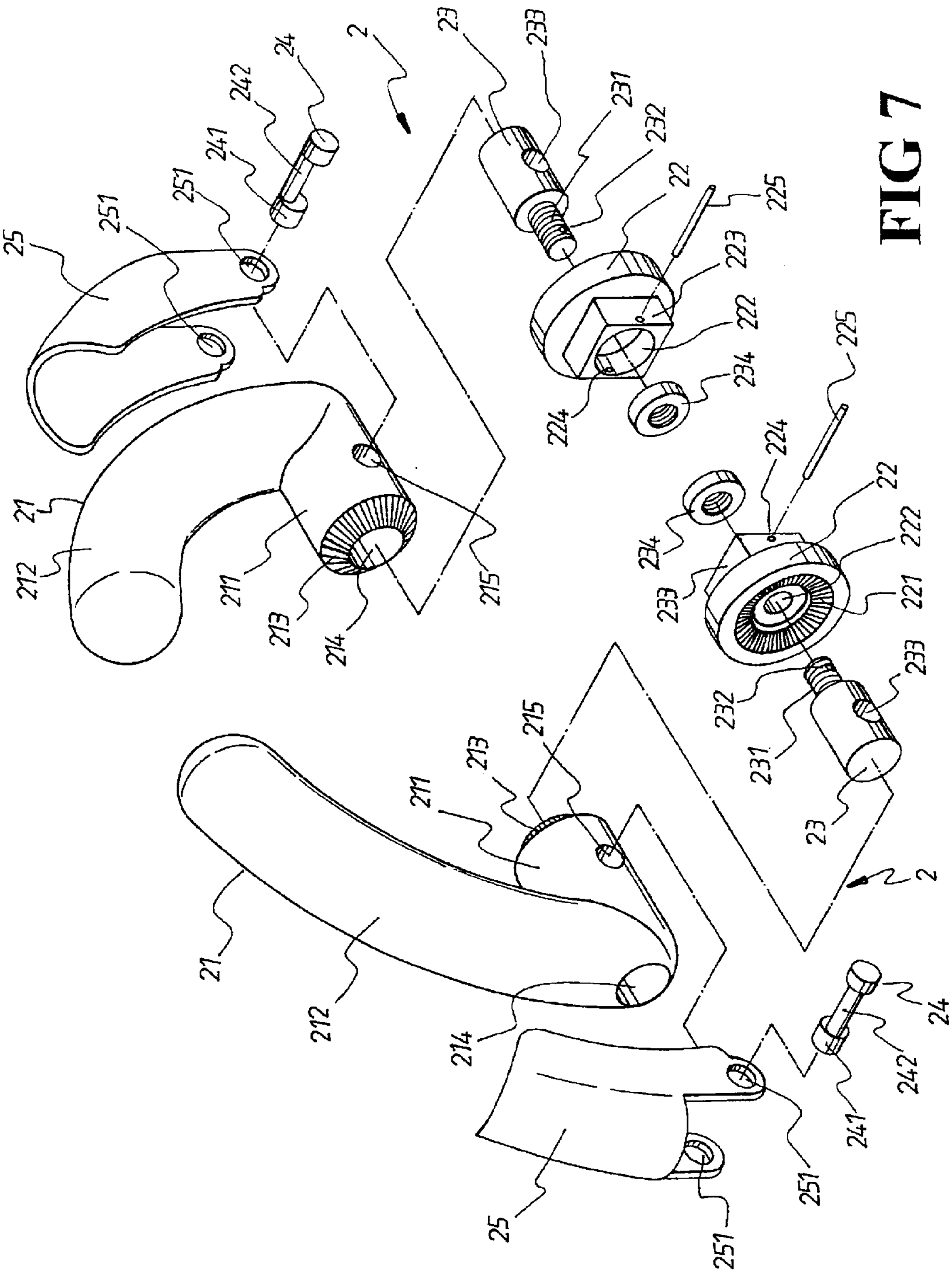
FIG. 7 is an exploded perspective view of the pivotal handle according to the present invention.
Figure 9:
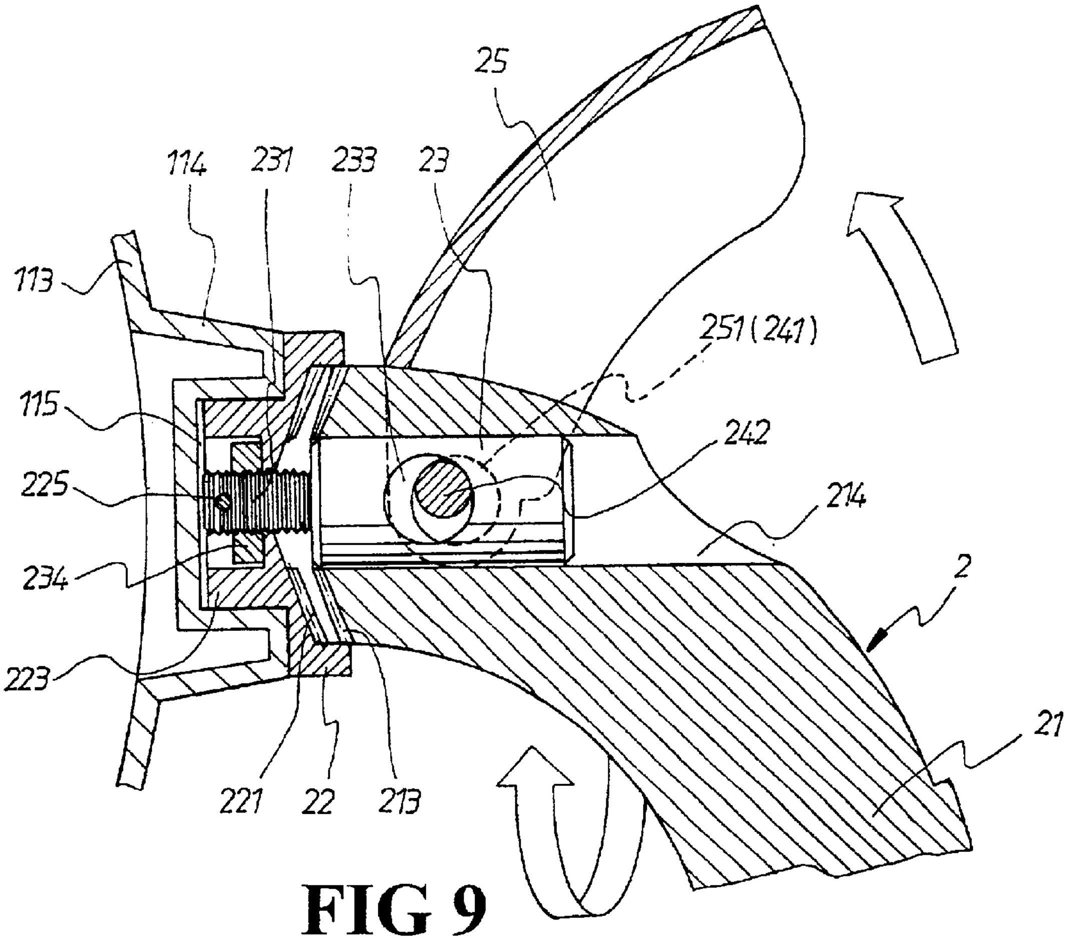
FIG. 9 is an operational schematic view of the pivotal handle of the present invention.

By above components, referring to FIGS. 7 and 9, the threaded section 231 of the shaft 23 can be inserted into the stepped hole 222 of the fixing seat 22. A nut 234 is screwed to the threaded section 231 from the back surface of the fixing seat 22 50 that the shaft 23 is firmly secured to the center of the fixing seat 22. The front end of the shaft 23 passes through the axial penetrating hole 214 of the arm 21. Therefore, the umbrella shape gear 213 of the arm 21 is engaged to the umbrella shape teeth 221 of the fixing seat 22. However, the through hole 233 of the shaft 23 is aligned with the pivotal hole 215 of the arm 21. Thus, the eccentric shaft 24 penetrates through the through hole 233 of the pivotal hole 215. By two ends of the cylindrical shaft 241 of the eccentric shaft 24, the pivotal hole 251 of the movable piece 25 is pivotally connected to one side of the arm 21. The eccentric section 242 of the eccentric shaft 24 is exactly positioned in the through hole 233 of the shaft 23 and resists against the inner wall of the through hole 233. Two umbrella shape gears 213 and 221 are engaged with one another tightly. Therefore, a pivotal handle 2 is formed.

Figure 8:
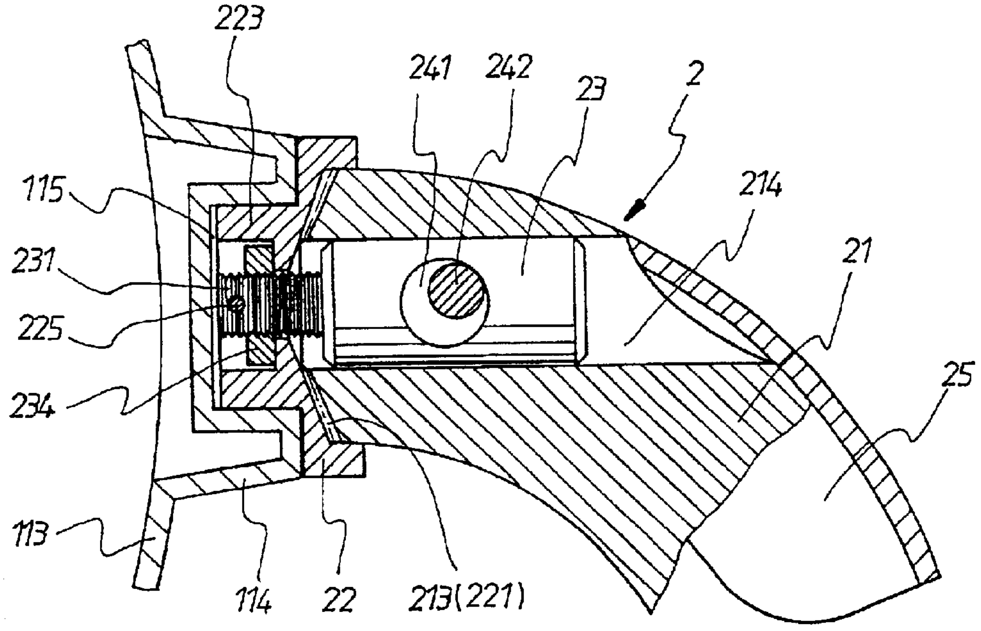
FIG. 8 is an assembled cross sectional view of the pivotal handle according to the present invention.

With reference to FIGS. 6 and 8. in the present invention, two pivotal handles 2 are selected to pass through the rectangular holes 115 at the two sides of the rear side of the casing 11. Thereby, the pin hole 224 of the fixing seat 22 is aligned to the penetrating hole 116 of the protruded seat 113 of the casing 11. A pin 225 passes through the penetrating hole 116 of the protruded seat 113, the pin hole 224 of the fixing seat 22, and the pin hole 224 of the shaft 23. Therefore, two pivotal handles 2 are firmly secured to the two sides of the casing 11. Furthermore, the cambered arm 21 is extended forwards so that the angles of the handles 21 may be adjusted at two sides of the casing. Therefore, the car waxing machine 1 can be held. Thereby, the car waxing machine with a driving handle of the present invention is formed.

Figure 10:
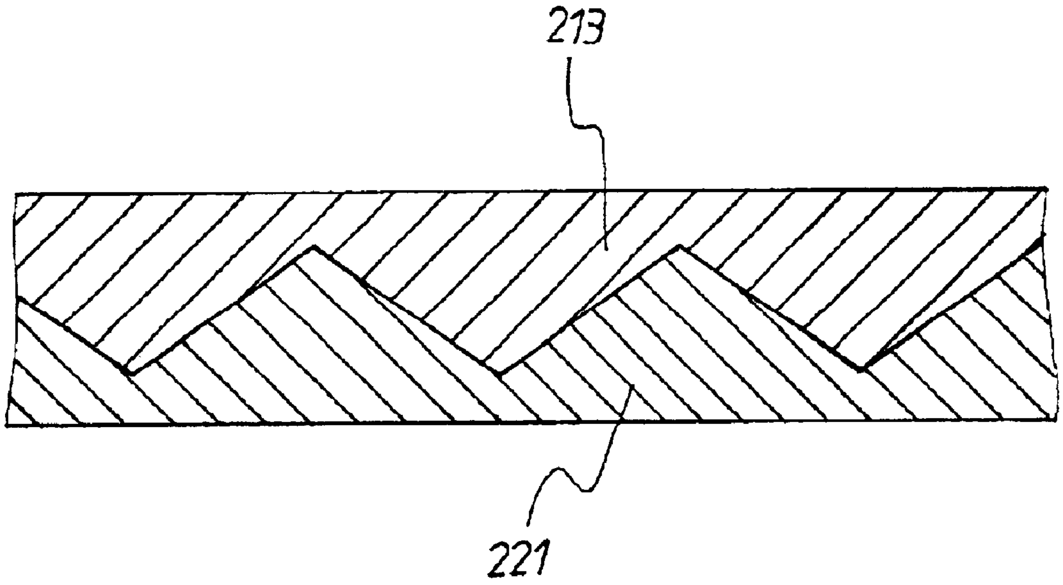
FIG. 10 is a schematic view showing the umbrella shape gear of the pivotal handle according to the present invention.

About the adjustment of the pivotal handle 2, when the movable piece 25 is separated from the arm 21 (referring to FIG. 9) so as to drive the eccentric shaft 24 to rotate through an angle and thus the eccentric section 242 does not resist against the hole wall at front side of the through hole 233. Therefore, the arm 21 can be moved by the user directly. By the umbrella shape gears 213, and 221, as shown in FIGS. 10 and 11, an intermittent buckling is generated so as to adjust the rotating angle of the arm 21. In detail, the two umbrella shape gears 213, 221 are engaged slightly. When the arm 21 rotates due to the elasticity of plastics, the umbrella shape gear 213 may rotate and engaged intermittently. When the movable piece 25 moves to a predetermined position, see FIG. 8, the eccentric section 242 of the eccentric shaft 24 resists against the front hole wall of the through hole 233 of the shaft 23, so that the arm 21 is tightly engaged with the umbrella shape gears 213, 221 of the fixing seat 22 and thus is fixed with a predetermined angle. Therefore, the user may adjust the angle of the pivotal handle 2 formed by above components freely.

Figure 12:
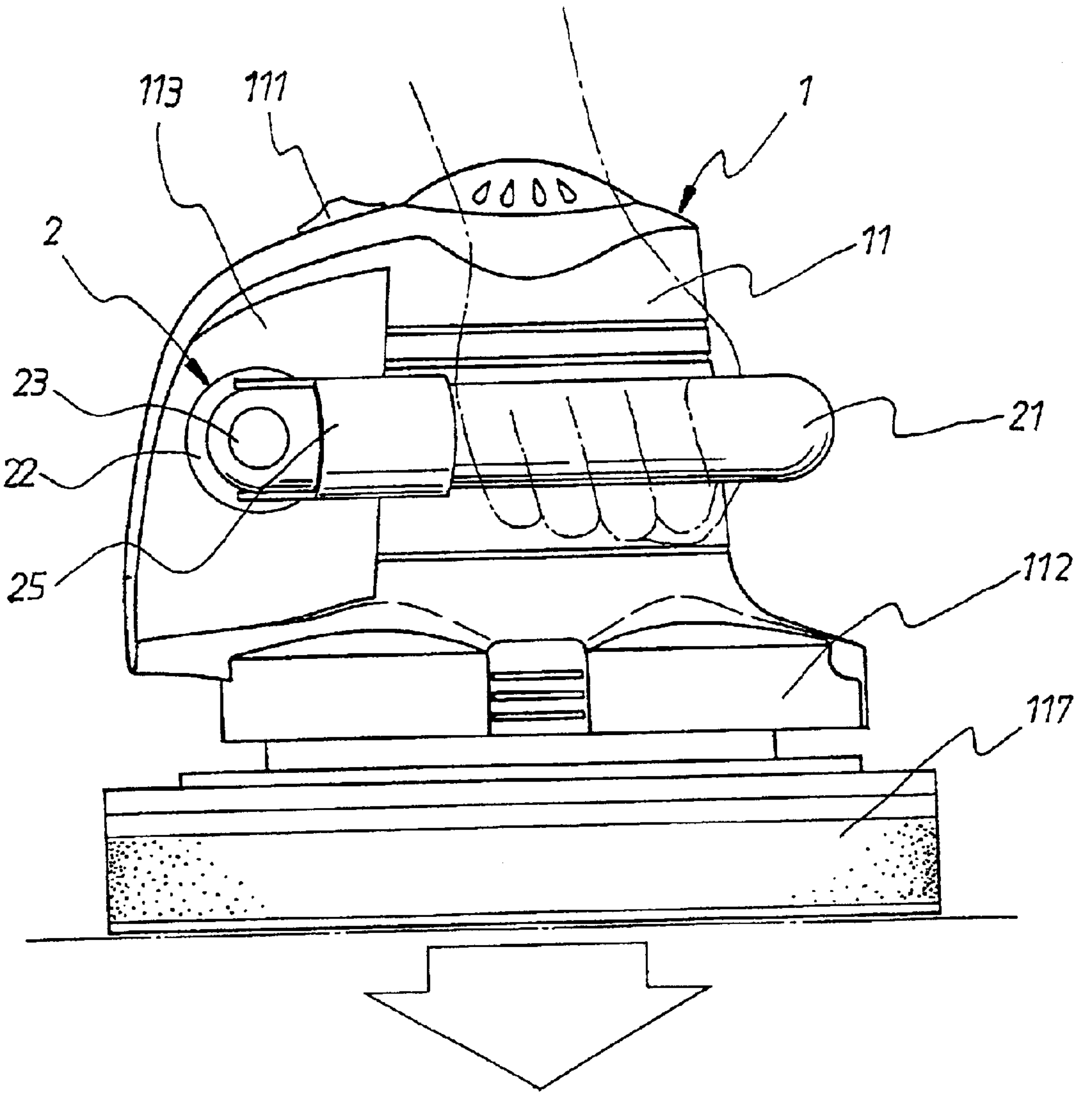
FIG. 12 is a schematic view showing the application of the pivotal handle of the present invention.

By aforesaid car waxing machine with a driving handle, as shown in FIGS. 11 and 12, the orientation of the arm 21 is adjustable and are horizontally arranged at two sides of the car waxing machine 1. Thereby, the user may hold the arm 21 by two hands and uniformly press the car waxing machine 1. Thus, the wax can be applied by the polished body 117 at the bottom thereof. Since the forces are applied uniformly, the bottom of the polished body 117 wholly contacts the surface of the car. As a result, the defect of the prior art that the handle is installed at a front side is improved and the waxing work is performed effectively. Moreover, by the design of the pivotal handle 2 of the present invention, when the user waxes for various part of a car, the user may adjust the angle of the pivotal handle 2 to match different parts of the car or match the habit of the user so as to wax easily.

Figure 13:
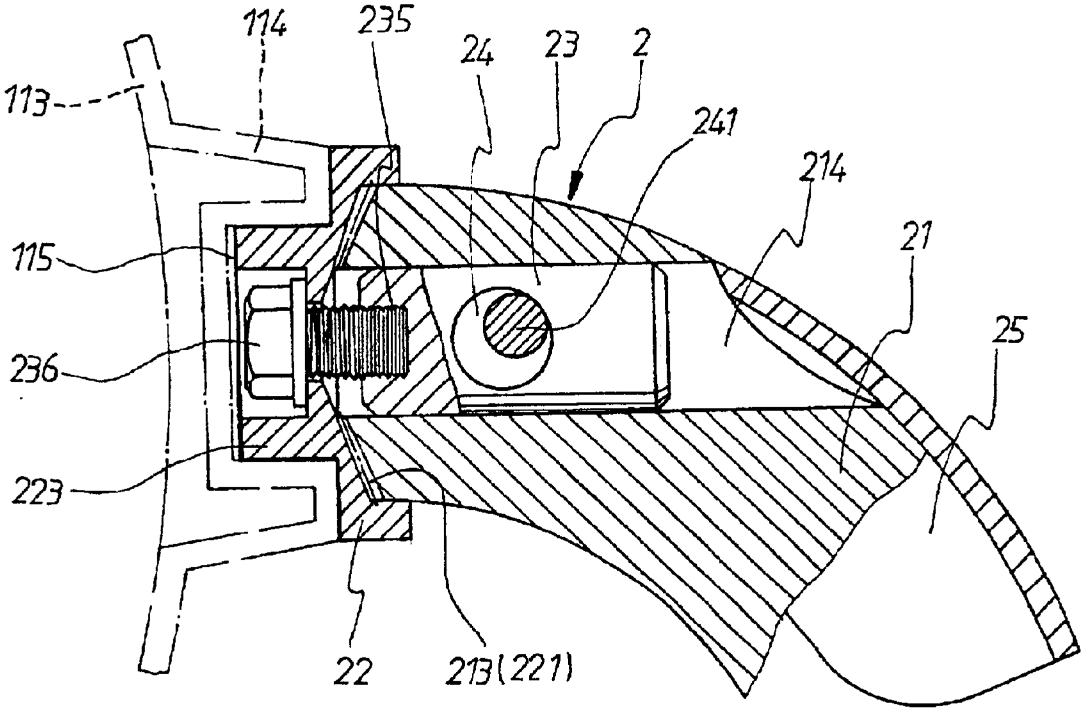
FIG. 13 is a cross sectional view of another embodiment of the present invention wherein the shaft of the pivotal handle is illustrated.

The way for securing the shaft 23 of the pivotal handle 2 firmly to the fixing seat 22 is not confined to the threaded section 231 (referring to FIG. 13). The distal end of the shaft 23 may be installed with a threaded hole 235. Thereby, the shaft 23 is fixed at the front center of the fixing seat 22. Then a stud 236 may be used to screw into the threaded hole 235 from the backside of the fixing seat 22, so that the shaft 23 is steadily combined with the fixing seat 22.

Figure 14:
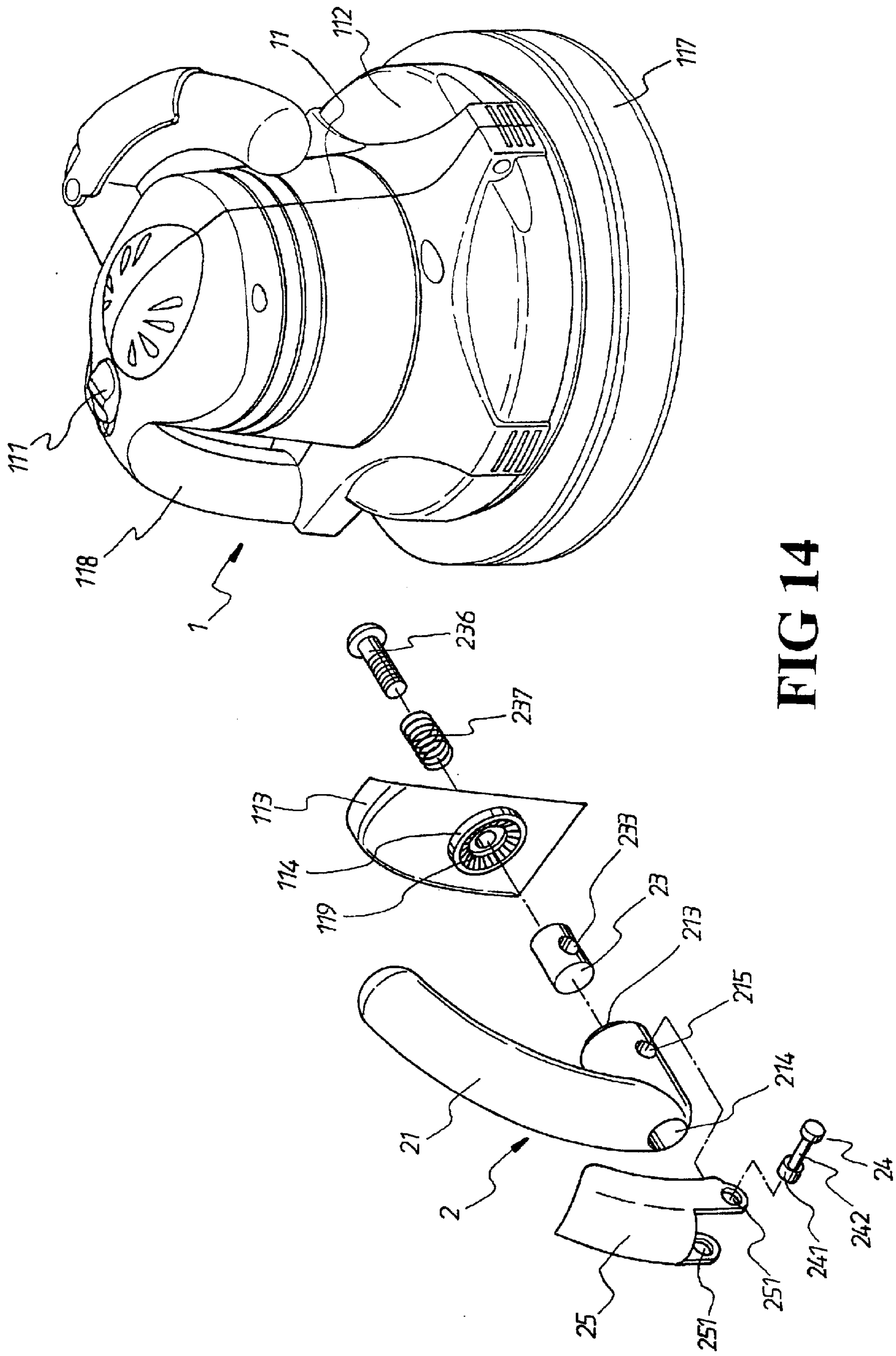
FIG. 14 is an exploded perspective view of another embodiment of the protruding seat of the car waxing machine according to the present invention.
Figure 16:
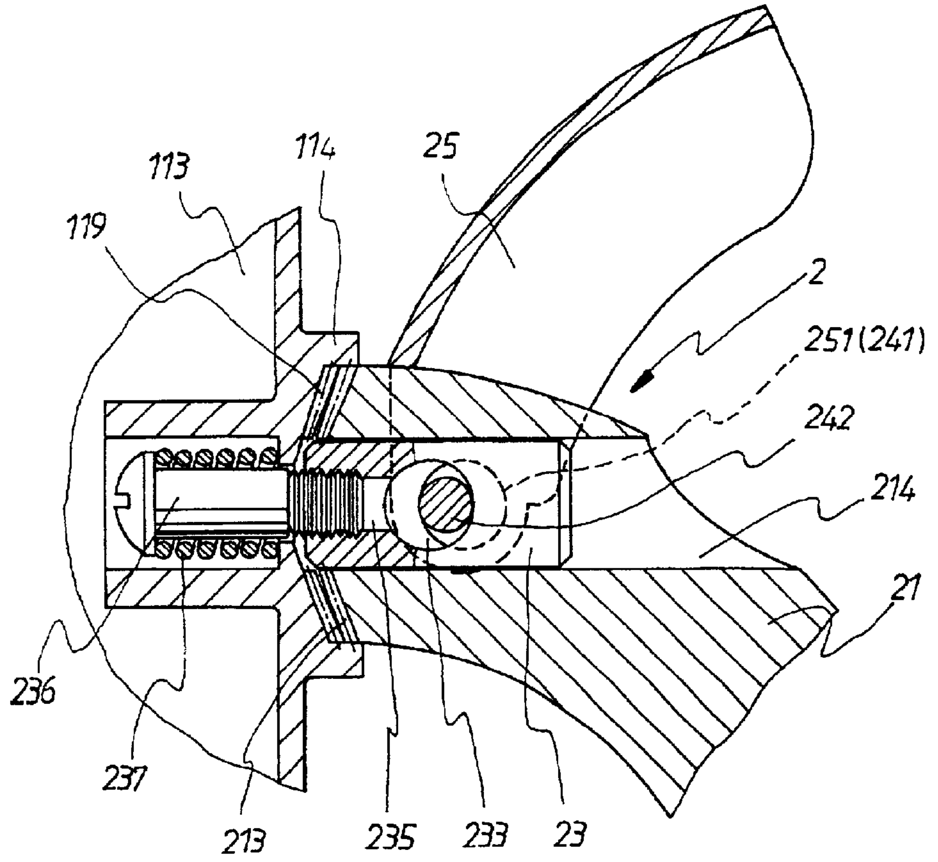
FIG. 16 is a cross sectional view of another embodiment of the pivotal handle according to the present invention illustrated one application thereof.
Figure 15:
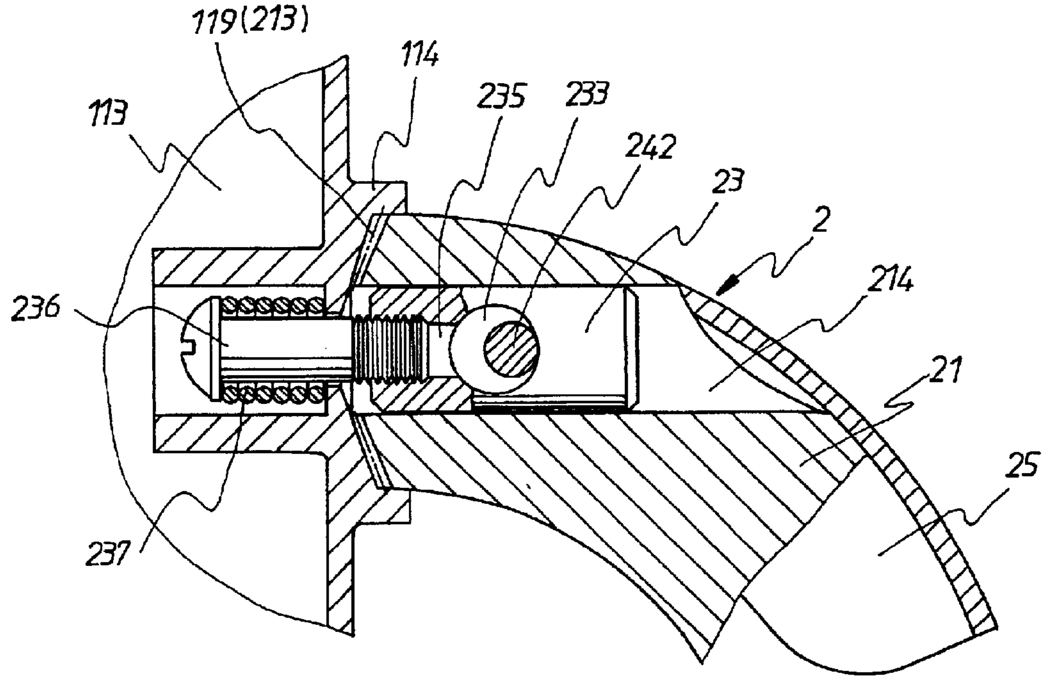
FIG. 15 is a cross sectional view of another embodiment of the pivotal handle according to the present invention.

Furthermore, referring to FIG. 14, for the structure of the protruding seat 113 of the casing 11 of the car waxing machine 1, the vertical handle 118 at the rear side may be used. The two sides of the through hole of the vertical handle 118 are firmly secured with respective protruding seats 113 for being pivotally installed with pivotal handle 2. Moreover, as shown in FIGS. 14, 15, and 16, in the pivotal handle 2 of the post 114 of the protruding seat 113, the structure of the rectangular hole 115 and the fixing seat 22 can be cancelled. A concave umbrella shape gear 119 can be installed at the center of the post 114. Further, the distal end of the shaft 23 is formed with a threaded hole 235, and the shaft 23 is placed at the center of the umbrella shape gear 119 of the post 114. A spring 237 and a stud 236 may be screwed into the threaded hole 235 of the shaft 23 from the inner surface of the post 114 so that the shaft 23 is directly combined with the post 114 of the protruding seat 113. Then the front end of the shaft 23 passes through the penetrating hole 214 of the arm 21. Therefore, the umbrella shape gear 213 of the arm 21 is engaged with the umbrella shape gear 119 of the post 114.

Figure 17:
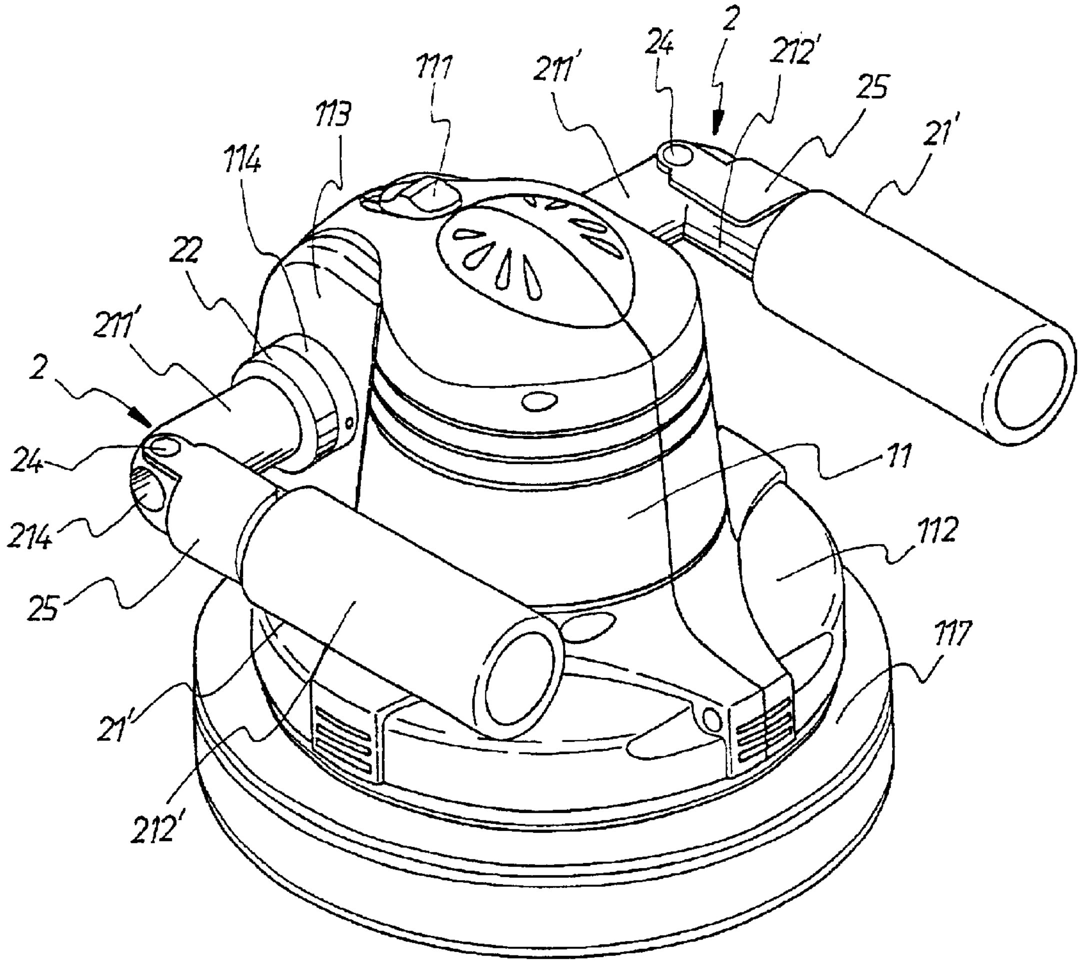
FIG. 17 is an assembly view of another embodiment of the arm in the present invention.
Figure 18:
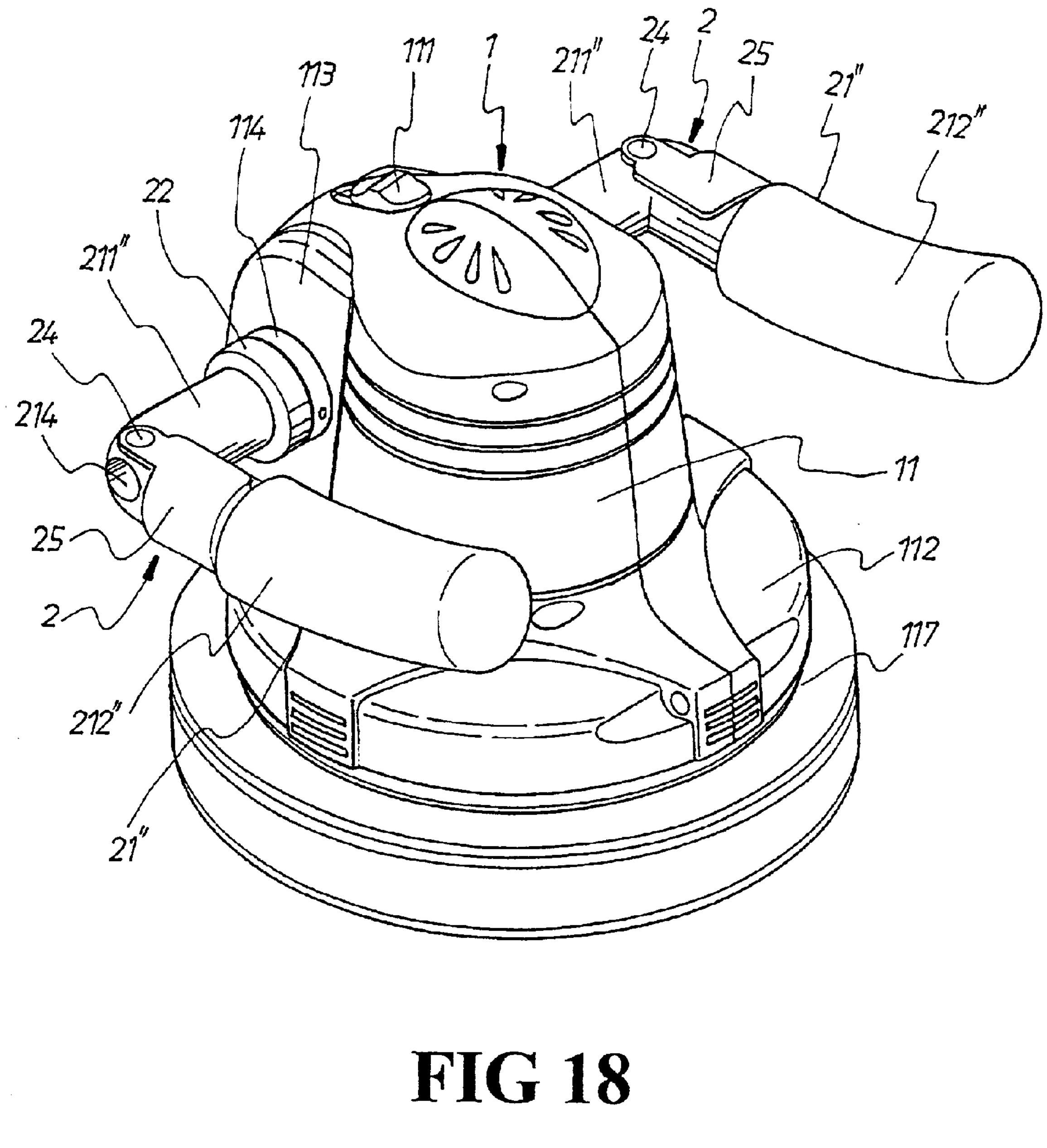
FIG. 18 is an assembly view of a further embodiment of the arm in the present invention.

Moreover, in the present invention, the arm 21 of the pivotal handle 2 is confined to the cambered holding end 212 (referring to FIG. 17). The arm 21' can be bent as a vertical holding end 212'. The fixing seat 22, eccentric shaft 24, movable piece 25, etc. are assembled as above structure. Thereby, the angle of the holding end 212' of the are 21' is adjustable to horizontally extend to two sides of the car waxing machine 1 so that users may uniformly apply force thereto. Furthermore, as shown in FIG. 18, the arm 21' may be bent and have a holding end 212" which is slightly bent upwards. The fixing seat 22, eccentric shaft 24, movable piece 25, etc. are assembled as above structure. Thereby, the user may execute the action of holding, pressing downwards, and pushing forwards. Consequently, the car waxing machine 1 of the present invention can be held conveniently and easily.

The present invention are thus described, it will be obvious that the same may be varied in many ways, for example, the car waxing machine 1 and the pivotal handle 2 can be modified, but still have the same effect. Such variations are not to be regarded as a departure from the spirit and scope of the present invention, and all such modifications as would be obvious to one skilled in the art are intended to be included within the scope of the following claims.

What is claimed is:

1. A car waxing machine with a driving handle comprising a car waxing machine and two pivotal handles, a casing enclosing the car waxing machine; an outer side of the casing being installed with a power switch; and an interior thereof being installed with a driving motor; a bottom thereof having a polished body; and the driving motor driving the polished body to rotate, characterized in that:

the pivotal handle is a rod shape arm; the arm has a bent structure; thereby, a rear section of the pivotal handle has a pivotal end and a front end thereof has an arm; by the arms of the two pivotal handles to be pivotally connected to two sides at a rear end of the car waxing machine so as to form a structure with two arms at two sides which is rotatable to adjust the orientations of the arm; thereby, the arms are adjustable to horizontally extend to the two sides of the car waxing machine.

2. The car waxing machine as claimed in claim 1, wherein the power switch is at an upper end of the car waxing machine.

3. The car waxing machine as claimed in claim 1, wherein a round seat is installed at the casing of the car waxing machine and a lower side of the round seat has a round polished body.

4. The car waxing machine as claimed in claim 1, wherein a rear side of the casing is installed with a projecting seat; two sides of the projecting seat are installed with respective posts; the post has a rectangular hole at a center portion thereof; by the rectangular hole, the arms of the pivotal handle can be installed at two sides of the rear end of the casing.

5. The car waxing machine as claimed in claim 4, wherein a concave umbrella shape gear is installed at a center of each post of the protruding seat.

6. The car waxing machine as claimed in claim 1, wherein the pivotal handle is formed by an arm, a fixing seat, a shaft, an eccentric shaft, and a movable piece;

the arm is a round pivotal end; the pivotal end is installed with an umbrella shape gear; a center of the umbrella shape gear is formed with an axial penetrating hole; a lateral surface of the pivotal end is installed with a radial penetrating pivotal hole; the fixing seat is a round seat; a center of a front surface thereof is installed with an umbrella shape gear which has triangular teeth and are concave; a center of the umbrella shape gear is installed with a stepped hole which penetrates the umbrella shape gear; a rear side thereof is installed with a rectangular post; the shaft is a round cylindrical rod; one end thereof has a threaded section; one lateral surface of the threaded section has a pin hole; one lateral surface of the round cylindrical rod is radially installed with a through hole; a diameter of the through hole is identical to that of the pivotal hole of the arm; the eccentric shaft is a cylindrical shaft; a middle section thereof is installed with an eccentric section so as to form a shifted round shaft; the movable piece is installed as a cambered piece and has a U shape cross section; two lateral walls at the distal end thereof are formed with respective pivotal holes;

wherein the threaded section of the shaft is inserted into the stepped hole of the fixing seat; a nut is screwed to the threaded section from a back surface of the fixing seat so that the shaft is firmly secured to the center of the fixing seat; a front end of the shaft passes through the axial penetrating hole of the arm; the eccentric shaft penetrates through the through hole of the pivotal hole; by movable pieces at two ends of the cylindrical shaft of the eccentric shaft, the pivotal hole of the movable piece is pivotally inserted by one side of the arm; the eccentric section of the eccentric section is exactly positioned in and resists against the through hole of the shaft; two umbrella shape gears are engaged with one another tightly; as the movable pieces are moved so that the two umbrella shape gears are released, the orientation of the handles are adjustable; therefore, a pivotal handle of the car waxing machine is formed.

7. The car waxing machine with a driving handle as claimed in claim 6, wherein in the pivotal handle, by the rectangular posts are engaged to the rectangular holes at two sides of the casing of the car waxing machine, the orientations of the arms are adjustable.

8. The car waxing machine with a driving handle as claimed in claim 6, wherein an end portion of the shaft of the pivotal handle has a threaded hole, by a stud, the shaft is screwed to a center of the fixing seat, thereby, a front end of the shaft passes through the through hole of the arm.

9. The car waxing machine as claimed in claim 6, wherein the shaft is directly combined with the post of the car waxing machine having an umbrella shape gear at a center; then a front end of the shaft passes through the penetrating hole of the arm; therefore, the umbrella shape gear of the arm is engaged with the umbrella shape gear of the post.

10. The car waxing machine as claimed in claim 9, wherein a distal end of the shaft is formed with a threaded hole, and the shaft is placed at a center of the umbrella shape gear of the post; a spring and a stud are screwed into the threaded hole of the shaft from the inner surface of the post so that the shaft is directly combined with the post of the protruding seat; then the front end of the shaft passes through the penetrating hole of the arm; therefore, the umbrella shape gear of the arm is engaged with the umbrella shape gear of the post.

11. The car waxing machine as claimed in claim 1, wherein the arm of the pivotal handle is bent to have a cambered holding structure.

12. The car waxing machine as claimed in claim 1, wherein the arm of the pivotal handle is bent to have a vertical holding end.

13. The car waxing machine as claimed in claim 1, wherein the arm is bent and have a holding end which is slightly bent upwards; thereby, the user executes the action of holding, pressing downwards, and pushing forwards.

* * * * *